Aug. 11, 1925.

A. C. KADING 1,549,004

TRACTION INCREASING ATTACHMENT FOR VEHICLE WHEELS

Filed Sept. 5, 1924

Inventor
A. C. Kading.
By Clarence A. O'Brien
Attorney

Patented Aug. 11, 1925.

1,549,004

UNITED STATES PATENT OFFICE.

AUGUST C. KADING, OF DES MOINES, IOWA.

TRACTION-INCREASING ATTACHMENT FOR VEHICLE WHEELS.

Application filed September 5, 1924. Serial No. 736,071.

*To all whom it may concern:*

Be it known that I, AUGUST C. KADING, a citizen of the United States, residing at Des Moines, in the county of Polk and State of Iowa, have invented certain new and useful Improvements in Traction-Increasing Attachments for Vehicle Wheels, of which the following is a specification.

This invention relates to improvements in traction increasing devices, and has for its principal object to provide an attachment for vehicle wheels, which may be readily and easily secured in position on a vehicle wheel, either of the wooden or disc type for preventing the wheels from slipping on icy or muddy surfaces.

Another important object of the invention is to provide a traction increasing attachment of the above mentioned character which will, at all times, be positive and efficient in its operation, the same in no way interfering with the tire on the wheel when attached thereon, thereby preventing any injury to the tire.

A further object of the invention is to provide a traction increasing attachment of the above mentioned character, wherein means is provided for adjusting the ground engaging members in their casings.

A further object of the invention is to provide a traction increasing attachment of the above mentioned character, which is simple in construction, inexpensive, strong and durable, and further well adapted for the purposes for which it is designated.

Other objects and advantages of this invention will become apparent during the course of the following description.

In the accompanying drawing, forming a part of this specification, and in which like numerals designate like parts throughout the same:

Figure 1:
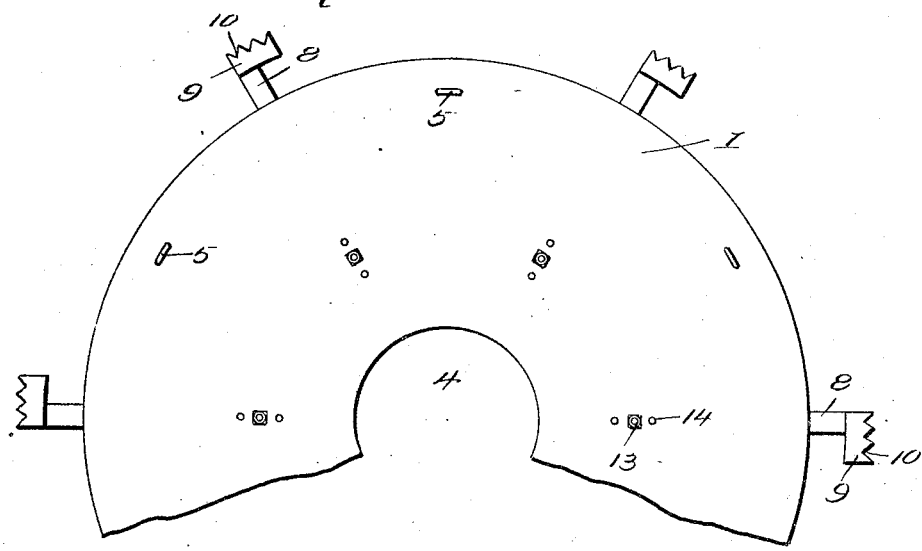
Figure 1 is a fragmentary rear elevation of the traction increasing attachment embodying the present invention.
Figure 2:
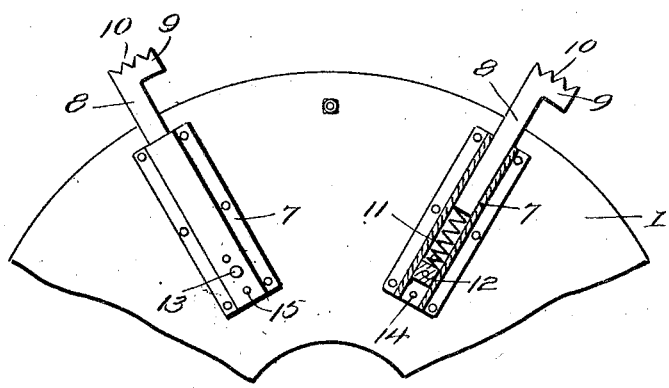
Figure 2 is a fragmentary front elevation thereof, showing one of the casings in section.
Figure 3:
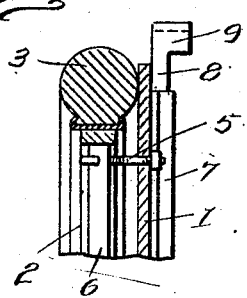
Figure 3 is a fragmentary sectional view, showing the attachment secured to a wheel of the wooden type.
Figure 4:
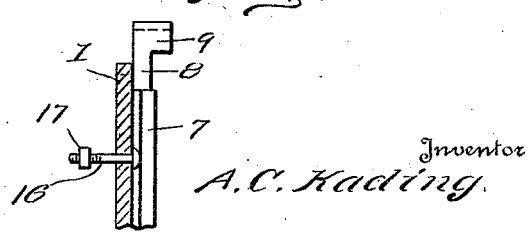
Figure 4 is a fragmentary detail view of a modified form of securing means, which is adapted to be associated with a wheel of the disc type.

In the drawing, wherein for the purpose of illustration is shown the preferred embodiment of my invention, the numeral 1 designates a circular plate, which is of a diameter slightly less than the diameter of the wheel 2, with the tire 3 mounted thereon. This is more clearly illustrated in Figure 3 of the drawing. The plate 1 is provided with a central opening 4, and the same may extend over the hub of the wheel 2 (not shown). When the traction increasing device is attached to a wheel of the wooden type, the hooks 5 are associated with the plate and the same are adapted for engagement with the spokes 6 of the wooden wheel 2, in the manner as illustrated in Figure 3. This construction enables the attachment to be readily and easily secured in position on a vehicle wheel.

Arranged on the outer face of the plate 1 are a series of radially extending casings designated generally by the numeral 7, the open ends thereof being spaced from the outer periphery of the plate. Slidably mounted in each of the casings 7 is the plunger 8, the outer end of which extends beyond the outer periphery of the circular plate 1, and the tread portion of the tire 3 and formed on the outer end of the plungers are the ground engaging lugs 9, the outer face of each of the ground engaging lugs having the teeth 10 formed therein for insuring a gripping action.

An expansible coil spring 11 is mounted in each of the casings, the outer end of each spring engaging the inner end of the respective plunger, while the inner end of each of the coil springs is in engagement with an adjustable block 12, which is adapted for slidable adjustment in the inner end of each of the casings through means of the bolts 13 and a series of spaced openings arranged in the circular plate 1, and which further register with the openings 15 provided in the front face of the casing 7. The purpose of the provision of the adjusting lock 12 is to provide a means for controlling the tension of the coil springs whereby the inward movement of the plungers with respect to the casings are regulated.

The springs 11 normally urge the plungers outwardly so that the ground engaging members or lugs 9 extend outwardly of the tread portion of the tire 3, and as the various ground engaging lugs come in contact with the surface, the plunger will move inwardly against the tension of the coil springs 11, to prevent any possibility of the wheels leaving the ground. The teeth 10 of the ground engaging lugs will prevent any possibility of the same slipping when in contact with a slippery or muddy surface, and will insure greater traction, whereby the vehicle wheels may travel over a slippery or muddy surface without any danger of the same skidding.

Where the attachment is to be used in conjunction with wheels of the disc type, the circular plate is provided with a series of bolts, such as are shown at 16, the threaded ends of which are adapted to extend through suitable openings provided therefor in the disc wheel, and the nut 17 is associated with the other end of each of the bolts for securing the attachment in a rigid position on the disc wheel.

The simplicity in which my improved traction increasing device is constructed, enables the same to be readily and easily attached to a vehicle wheel, and will at all times be positive and efficient in its operation, and furthermore will not injure a pneumatic tire mounted on the wheel.

While I have shown the preferred embodiment of my invention, it is to be understood that various changes in the size, shape and arrangement of parts may be resorted to without departing from the spirit of the invention and the scope of the appended claim.

Having thus described my invention, what I claim is:

As a new article of manufacture, an attachment including a circular plate, means for detachably securing the plate to a wheel, a series of radially extending casings secured on the outer face of the plate adjacent the periphery thereof, plungers slidably mounted in said casings, ground engaging lugs on the outer ends of said plungers and extending laterally therefrom and tangentially in respect to the periphery of the plate, coil springs arranged in said casings and engaging the inner ends of the plungers, and blocks adjustably supported in the inner ends of said casings for tensioning the springs.

In testimony whereof I affix my signature.

AUGUST C. KADING.